July 31, 1951  R. E. BLUE  2,562,595
SHOCK ABSORBER

Filed April 22, 1946  2 Sheets-Sheet 1

INVENTOR.
Roy E. Blue.
BY
Harness and Harris
ATTORNEYS.

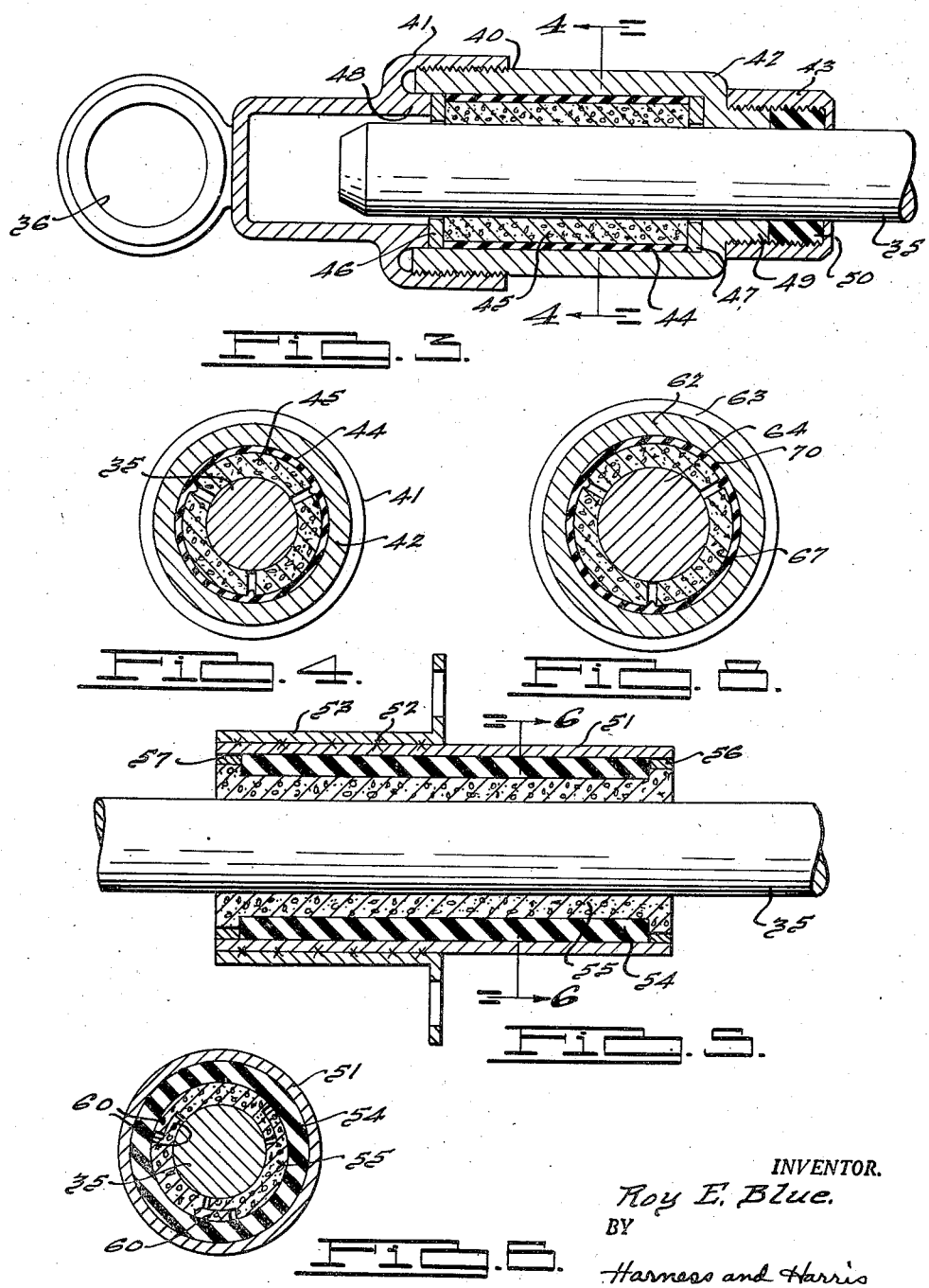

Patented July 31, 1951

2,562,595

UNITED STATES PATENT OFFICE 2,562,595

SHOCK ABSORBER

Roy E. Blue, Detroit, Mich., assignor to Chrysler Corporation, Highland Park, Mich., a corporation of Delaware Application April 22, 1946, Serial No. 663,910

3 Claims. (Cl. 267—1)

My invention relates to shock absorbers and more particularly to shock absorbers installed in stabilizing struts and tie rods of motor vehicles.

It is an object of my invention to provide a shock absorber of simple construction which may be economically manufactured. It has been the practice to make devices of this nature of the hydraulic type which utilize a cylinder, a piston, a fluid, and various combinations of valves and restricted openings. It is believed that these devices are unduly complicated and expensive to manufacture.

It is a further object of this invention to provide a shock absorber construction whose performance is uniform and not affected by changes in humidity or weather.

Another object of this invention is to provide a shock absorber construction which operates with a minimum of noise or squeak.

It is a further object of this device to provide a shock absorber construction which can be used in the stabilizing strut commonly used as a transverse connecting rod between the vehicle's sprung portion (usually its frame) and the unsprung portion or rear axle to check side sway and which, with but slight modification, can be installed in the tie rods or linkage connecting the vehicle steering mechanism with the front wheel mountings.

The shock absorber construction described herein is not limited in application to vehicle tie rods and stabilizer struts, but these are representative uses of the shock absorber. Other uses could also be found but my description will, for the sake of brevity, limit itself to these applications.

In the drawings,

Fig. 3 is a section on the line 3—3 of Fig. 1 showing the construction of shock absorber used in the stabilizer strut.

Fig. 4 is a section on the line 4—4 of Fig. 3.

Fig. 5 is a longitudinal section of a modified form of the Fig. 3 device.

Fig. 6 is a section on the line 6—6 of Fig. 5 showing the construction of shock absorber used in the stabilizer strut.

Fig. 8 is a section on the line 8—8 of Fig. 7.

Figure 1:
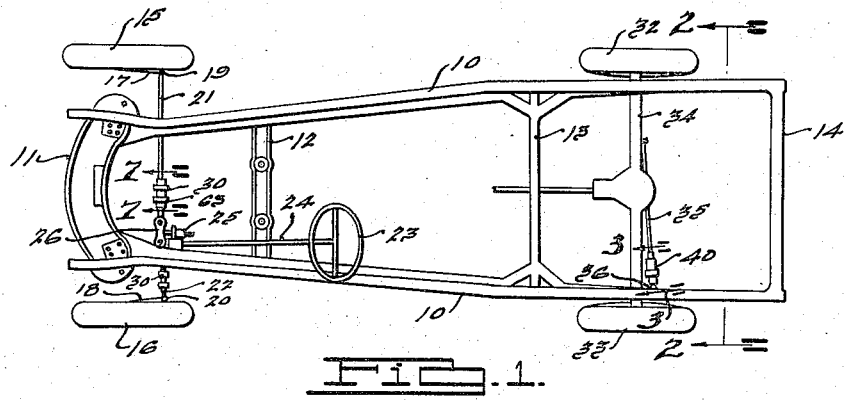
Fig. 1 is a horizontal view of a portion of an automobile chassis showing the places that my invention is to be installed.
Figure 2:
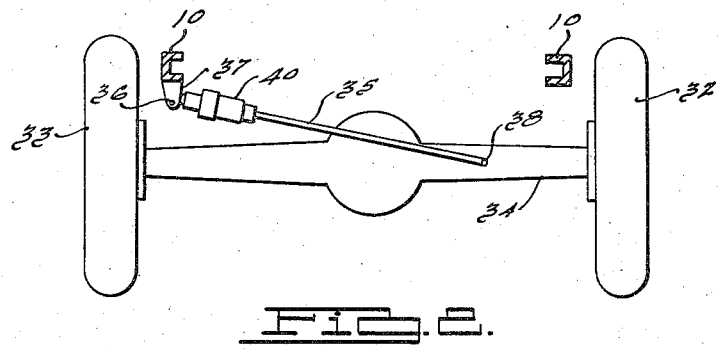
Fig. 2 is a section on the line 2—2 of Fig. 1.

In the drawings my invention is shown applied to a motor vehicle chassis having longitudinally extending transversely spaced side rails 10 which are connected by transverse members 11, 12, 13, and 14. The front road wheels 15 and 16 are each rotatably mounted on a suitable steering knuckle spindle (not shown) swivelled about a suitable king pin (not shown) for steering movement. The road wheels 15 and 16 may be supported for independent rising and falling movement by suitable means well known in the art.

The front road wheels 15 and 16 have rearwardly extending steering arms 17 and 18 respectively having jointed connections 19 and 20 with tie rods 21 and 22, respectively. The usual steering wheel 23 operates a shaft (not shown) disposed in the housing 24. This shaft operates the usual reduction gearing generally indicated at 25 to oscillate or swing the pitman arm 26 in the well known manner for imparting steering movements to the wheels 15 and 16. Two shock absorbers 30 to be described herein are assembled as integral parts of the tie rods.

The rear road wheels 32 and 33 are mounted on a rear axle contained in housing 34 and sprung from the frame side rails 10 in the usual manner. The spring structure is not shown herein. A stabilizer strut 35 is rotatably mounted at 36 on bracket 37 fixed to frame side rail 10. The other end of strut 35 is rotatably mounted on rear axle housing 34 at 38. Shock absorber 40 is incorporated in the structure of strut 35.

The resistance to relative movement between two members is effected in my shock absorber by the friction between a surface of molded and sintered powdered metal having a lubricant content and the surface of one of the members. Means are provided to keep these contacting surfaces under pressure to increase the friction between them.

Figs. 3 and 4 illustrate the construction of the shock absorber 40 as used in the stabilizer strut 35. A housing preferably formed of three elements 41, 42, and 43 for ease of assembly has element 41 rotatably mounted at 36 on bracket 37. The strut 35 penetrates the housing at the opposite end from the mounting at 36. Housing element 42 is preferably in the form of a hollow cylinder and has fitted therein around its inner periphery a resilient member 44, preferably rubber, of cylindrical form. A plurality of arcuate segments 45, preferably three in number, are positioned within the resilient member 44 and disposed around the periphery of strut 35. These segments are formed by molding and sintering powdered metal or metals of different melting points in a manner now well known in forming porous metal bearings of the self-lubricating type as, by way of example, set forth in patent to C. A. Tea 1,927,619 of September 19, 1933, and to W. G. Calkins et al. 1,927,627 of September 19, 1935. Lubricant may be provided in the form of graphite included in the metal mixture supplemented by or substituted by fluid lubricant absorbed by immersing the bushing in lubricating oil then to be exuded to the friction surface of strut 35. The lubricant eliminates noise or squeak. The segments 45 are plural in number because of the fact that they are metal and substantially rigid and as the friction surface they must be adapted to be compressed around strut 35. Relative movement between the segments provides the desired flexibility. The resilient member 44 provides sufficient flexibility so that the housing element containing the segments 45 may be forced on to strut 35 with the surface engagement between segments 45 and strut 35 under considerable pressure. Washers 46 and 47 cooperating with the base of housing element 42 and projecion 48 on element 41 hold the segments 45 and member 44 in place when housing elements 41 and 42 are threaded together. Housing element 43 threads on an extension 49 of housing element 42 and contains therein a moisture sealing washer 50, preferably rubber. Longitudinal movement in either direction of strut 35 relative to the housing is possible but resisted by friction. The segments 45 are preferably compressed around strut 35 with sufficient pressure to require a substantial force to cause relative movement between the housing and the strut 35. This may be accomplished by having a force fit between the dimensions of the segments and the strut whereby the shaft is driven into place under pressure.

A simplified form of the Fig. 3 device is shown in Figs. 5 and 6. The tubular cylindrical housing 51 has welded as at 52 or otherwise fixed thereon a bracket 53 which may be attached to the frame side rail 10 in any suitable manner. The resilient member 54, preferably formed of rubber, is retained in housing 51 by snap rings 56 and 57 and it in turn encompasses a plurality of arcuate segments 55, preferably three in number. These segments are formed by molding and sintering powdered metal or metals of different melting points as explained above in the description of the Fig. 3 form. Lubricant may be provided in the form of graphite included in the metal mixture supplemented by or substituted by fluid lubricant absorbed by immersing the bushing in lubricant oil then to be exuded to the friction surface of strut 35. The segments 55 are preferably formed with an undercut adjacent their longitudinal edges. The surface from which the undercut is taken is alternated so that the shoulders 60 cooperate with the adjacent undercut to give the segments 55 a degree of stability and yet permit a radial contraction of the cylinder formed by the cooperating segments. The strut 35 is assembled with a force fit between it and the segments 55 so that a substantial force is required to overcome the friction between the two surfaces and cause relative movement.

Figure 7:
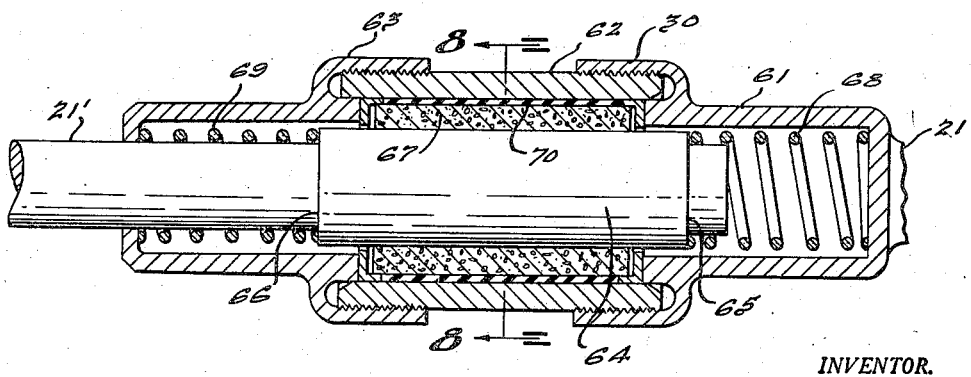
Fig. 7 is a longitudinal sectional view of the device used in the front wheel tie rods.

Figs. 7 and 8 illustrate shock absorbers 30 which have springs added to adapt them for use in the steering mechanism of the vehicle. In the steering mechanism it is necessary that the shock absorber return to a designated position after the movement caused by a bump so that the tie rod length and steering will not be permanently distorted. The tie rod 21 has a housing element 61 formed thereon. Housing elements 62 and 63 are threaded thereto. The second portion of the tie rod 21' penetrates the housings and is mounted on pitman arm 26. Rod 21' has a portion 64 having an enlarged diameter and forming shoulders 65 and 66. Enlarged portion 64 of rod 21' has compressed thereon segments 67 which are similar to segments 45 of the Fig. 3 device. These segments 67 are preferably three in number and have spaces therebetween whereby they can be moved radially inward. The segments are formed of a molded and sintered powdered metal having a lubricant content therein as in Fig. 3. The segments are retained within a cylinder of resilient material 70. Washers 71 and 72 position the resilient material 70 and threading the housing elements together increases pressure on the resilient material thereby increasing friction between segments 67 and the tie rod 21'. Springs 68 and 69 are disposed in housing elements 61 and 63, respectively. These springs abut their respective housing elements and rod shoulders 65 and 66 and are adapted to return rod 21' to the position illustrated in Fig. 7 relative to housing elements 61, 62, and 63 after the distorting load has been removed therefrom. Movement of rod 21' in the housing is possible, but considerable force is required and the springs return it to its original position.

The incorporation of a device of this nature in the steering tie rods permits a front road wheel to be shocked by road bumps and the motion is dampened and not transmitted through the tie rods to the other front road wheel. A shock absorber is preferably provided in each tie rod.

I claim:

1. A shock absorber device comprising a housing, an inner member slidably mounted for movement in either direction from an initial position relative to said housing, resilient means engaging said housing, a plurality of arcuate molded and sintered powdered metal segments having a lubricant content circumferentially spaced around said inner member and constricted between said resilient means and said inner member, means carried by said housing and operable to positively retain said segments in substantially fixed relation to said housing whereby friction between said inner member and said segments yieldingly resists relative motion between said members and a pair of springs carried within said housing at opposite ends thereof and reacting against said inner member respectively from opposite directions whereby said inner member is returned to said initial position regardless of direction of movement.

2. A shock absorber device comprising a housing member having an elongated opening therein, a rod penetrating said opening, a plurality of arcuate molded and sintered metallic elements having a lubricant content therein surrounding said rod, means carried by said housing member and operable to positively limit axial movement of said elements relative to said housing and a tubular rubber element circumscribing said metallic elements and resiliently urging said metallic elements into frictional engagement with said rod to resist relative movement between said housing and said rod.

3. A shock absorber device comprising a housing member having an elongated opening therein, a rod penetrating said opening, a plurality of arcuate molded and sintered metallic elements having a lubricant content therein surrounding said rod, said arcuate elements being provided with undercut longitudinally extending edges adapted to facilitate overlapping of one element by an adjacent element and to accommodate radial contraction of the assembled elements, means carried by said housing member and operable to positively limit axial movement of said elements relative to said housing and a tubular element of elastic material circumscribing said metallic elements and resiliently urging said metallic elements into frictional engagement with said rod to resist relative movement between said housing and said rod.

ROY E. BLUE.

REFERENCES CITED

The following references are of record in the file of this patent:

UNITED STATES PATENTS

| Number | Name | Date |
|---|---|---|
| 1,058,758 | Kennedy | Apr. 15, 1913 |
| 1,401,398 | Duncan | Dec. 27, 1921 |
| 1,703,592 | Paton | Feb. 26, 1929 |
| 1,713,515 | Bechereau | May 21, 1929 |
| 1,713,914 | O'Connor | May 21, 1929 |
| 1,927,627 | Calkins et al. | Sept. 19, 1933 |
| 2,139,666 | Bogart | Dec. 13, 1938 |
| 2,178,527 | Wellman | Oct. 31, 1939 |
| 2,212,759 | Tea | Aug. 27, 1940 |
| 2,265,392 | Olander | Dec. 9, 1941 |
| 2,360,748 | Whisler, Jr., et al. | Oct. 17, 1944 |
| 2,373,508 | Snyder | Apr. 10, 1945 |

FOREIGN PATENTS

| Number | Country | Date |
|---|---|---|
| 356,801 | France | Oct. 18, 1905 |
| 664,306 | France | Apr. 22, 1929 |
| 367,661 | Great Britain | Feb. 25, 1932 |